(12) United States Patent
Agraharam et al.

(10) Patent No.: US 6,377,995 B2
(45) Date of Patent: Apr. 23, 2002

(54) INDEXING MULTIMEDIA COMMUNICATIONS

(75) Inventors: Sanjay Agraharam, Marlboro; Robert Edward Markowitz, Glen Rock; Kenneth H. Rosen; David Hilton Shur, both of Middletown; Joel A. Winthrop, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/025,940

(22) Filed: Feb. 19, 1998

(51) Int. Cl.[7] .............................................. G06F 15/16
(52) U.S. Cl. ....................... 709/231; 709/203
(58) Field of Search .............................. 709/203, 231, 709/232, 217, 204; 386/52, 65, 96, 97, 106

(56) References Cited

U.S. PATENT DOCUMENTS

| | | | | |
|---|---|---|---|---|
| 5,666,466 A | | 9/1997 | Lin et al. ..................... 704/246 |
| 5,710,591 A | | 1/1998 | Bruno et al. .................. 348/15 |
| 5,835,153 A | * | 11/1998 | Pratt et al. ................... 348/468 |
| 5,835,667 A | * | 11/1998 | Wactlar et al. ................ 386/96 |
| 5,894,480 A | * | 4/1999 | Hoffert et al. ................ 370/389 |
| 5,926,624 A | * | 7/1999 | Katz et al. ............. 395/200.47 |
| 5,928,330 A | * | 7/1999 | Goetz et al. ................. 709/231 |
| 6,035,304 A | * | 3/2000 | Machinda et al. ........... 707/104 |
| 6,038,368 A | * | 3/2000 | Boetje et al. ................. 386/52 |

OTHER PUBLICATIONS

Internet Faceit Information, Nov. 26, 1997.

* cited by examiner

Primary Examiner—Dung C. Dinh
Assistant Examiner—Tod Kupstas
(74) Attorney, Agent, or Firm—Oliff & Berridge, PLC

(57) ABSTRACT

A network based platform uses face recognition, speech recognition, background change detection and key scene events to index multimedia communications. Before the multimedia communication begins, active participants register their speech and face models with a server. The process consists of creating a speech sample, capturing a sample image of the participant and storing the data in a database. The server provides an indexing function for the multimedia communication. During the multimedia communication, metadata including time stamping is retained along with the multimedia content. The time stamping information is used for synchronizing the multimedia elements. The multimedia communication is then processed through the server to identify the multimedia communication participants based on speaker and face recognition models. This allows the server to create an index table that becomes an index of the multimedia communication. In addition, through scene change detection and background recognition, certain backgrounds and key scene information can be used for indexing. Therefore, through this indexing apparatus and method, a specific participant can be recognized as speaking and the content that the participant discussed can also be used for indexing.

18 Claims, 7 Drawing Sheets

| SPEAKER ID MODEL | VIDEO MODEL | ... | SOURCE | PARTICIPANT |
|---|---|---|---|---|
| Vo-102 | Vi-356 | ... | S1 | P1 |
|  |  | ... |  |  |

INDEXING MULTIMEDIA COMMUNICATIONS

BACKGROUND OF THE INVENTION

1. Field of Invention

This invention relates to multimedia communications. More particularly, this invention relates to a method and an apparatus for indexing multimedia communications.

2. Description of Related Art

Multimedia communications used, for example, in a conference call, may be saved for future review by conference call participants or other interested parties. That is, the audio, video and data communications that comprise the conference call may be stored for future retrieval and review. An individual may desire to see the entire conference call replayed, or may want to review only selected portions of the conference call. The individual may want to have participants identified to determine what they said and when they said it or to determine who is saying what. For example, the individual may want to review only the audio from one particular conference call participant.

However, some conference calls include more than one participant at a given location or end point. The audio, for example, for all the participants at a given location may be recorded and retained for future review. When a large number of participants are involved in the conference call, separating out individual audio tracks, for example, is difficult due to limitations of current systems to differentiate between the participants. This situation can arise when there are a large number of participants at all the locations or when there are a large number of participants at one particular location. Therefore, a more efficient and reliable method for indexing multimedia communications is needed.

SUMMARY OF THE INVENTION

The invention provides a reliable and efficient method and apparatus for indexing multimedia communications so that selected portions of the multimedia communications can be efficiently retrieved and replayed. The invention uses distinctive features of the multimedia communications to achieve the indexing. For example, the invention provides a combination of face recognition and voice recognition features to identify particular participants to a multicast, multimedia conference call. Data related to the identities of the particular participants, or metadata, may be added, as part of a multimedia data packet extension header, to multimedia data packets containing the audio and video information corresponding to the particular participants, thus indexing the multimedia data packets. The multimedia data packets with the extension headers may then be stored in a database or retransmitted in near real-time (i.e., with some small delay). Then, multimedia data packets containing, for example, audio from a particular individual, can be readily and reliably retrieved from the database by specifying the particular individual.

Other features, such as background detection and key scene changes can also be used to index the multimedia communications. Data related to these features is also added to multimedia data packet extension headers to allow reliable retrieval of data associated with these features.

In a preferred embodiment, the participants to the multimedia communications are connected via a local area network (LAN) to a multicast network. An index server within the multicast network receives the multimedia communications from different locations, manipulates/alters the communication and simultaneously broadcasts, or multicasts, the altered multimedia communications to all other locations involved in the multimedia communications. Alternately, the locations can be connected to the multicast network using plain old telephone service (POTS) lines with modems at individual locations and at the multicast network or using ISDN, xDSL, Cable Modem, and Frame Relay, for example.

These and other features and advantages of the invention are described in or are apparent from the following detailed description of the preferred embodiments.

BRIEF DESCRIPTION OF THE DRAWINGS

The invention is described in detail with reference to the following drawings, in which like numerals refer to like elements, and wherein.

DETAILED DESCRIPTION OF PREFERRED EMBODIMENTS

Multimedia communications can be provided with metadata that can be recorded along with the multimedia communications and possibly rebroadcast along with the original communications in near real time. Metadata is simply information about data. That is, metadata is information that can be used to further define or characterize the data. A paradigm example of metadata is a time stamp. When multimedia communications are recorded, a time of production may be associated with the communications. A time stamp can be added to the multimedia communications to provide an indexing function. However, a time stamp is often not an adequate method for indexing, multimedia communications.

One method for indexing multimedia communications is provided in U.S. Pat. No. 5,710,591, "Method and Apparatus for Recording and Indexing Audio and Multimedia Conference," which is hereby incorporated by reference. However, when the multimedia communications originate from several different locations a multicast feature must be included to provide optimum conference performance.

Accordingly, this invention provides a method and an apparatus to allow indexing of multicast, multimedia communications that is based on distinguishing features such as the identity of participants to the multimedia communications and other features associated with the locations where the multimedia communications originate. The participants in the multimedia communication can view a slightly time-delayed version of the original communication that now includes the metadata. The indexing then allows subsequent users of a multimedia communications service to easily and efficiently search for and replay audio, video and data communications of a particular individual, for example.

For example, the invention uses voice and image feature/object recognition in conjunction with RTP packet protocol information to identify specific speakers at a given location. Information that identifies the specific speakers is then inserted into RPT packets, and the RTP packets are rebroadcast/multicast to other participants in a multimedia communication. The thus-modified RTP packets may be stored and later retrieved on demand.

In one example of the invention, the indexing feature is provided for a multicast, multimedia conference call. However, the invention can be used with any multimedia communications.

Figure 1:
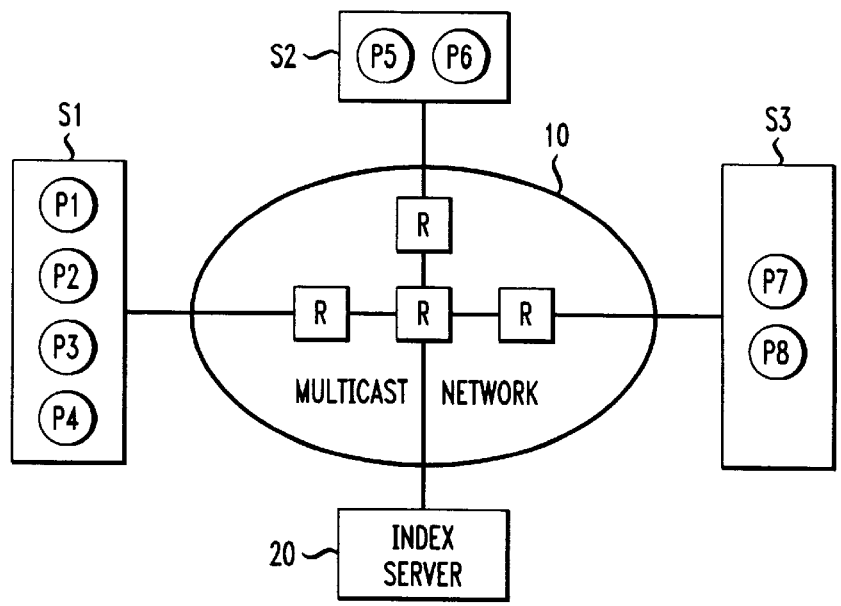
FIG. 1 is a block diagram of a multicast network according to the present invention.

FIG. 1 shows an example of an apparatus for completing the multicast, multimedia conference call. In FIG. 1, a multicast network 10 receives multimedia communications from locations, or sources, S1, S2 and S3, that are engaged in a multimedia conference call. Each of the sources S1, S2 and S3 includes one or more conference call participants. Thus, participants P1, P2, P3 and P4 are at the source S1; participants P5 and P6 are at the source S2; and participants P7 and P8 are at the source S3 in this example. However, the invention is not limited to three sources and eight participants, and any number of sources with any number of participants may be engaged in the multimedia conference call.

In FIG. 1, the sources S1, S2 and S3 connect to the multicast network 10 over a local area network such as an Ethernet or any local area network (e.g. ATM) capable of providing sufficient bandwidth. The multimedia conference call could also be completed over existing telephone lines using asymmetric digital subscriber line (ADSL) or integrated services digital network (ISDN) connectors. The method for providing the multimedia conference call could also operate over the public Internet in conjunction with Internet Protocols (IP). Finally, the method could also be applied to a public switched telephone network (PSTN), for example. The communications may use Real Time Protocols (RTP), Internet Protocols (IP) and User Datagram Protocols (UDP).

Communications from the sources S1, S2 and S3 are received at routers R located in the multicast network 10. The routers R ensure that the communications from each of the sources and from the multicast network 10 are sent to the desired address. The multicast network 10 connects to an index server 20. The index server 20 participates in the multimedia conference call among the sources S1, S2 and S3.

Figure 2:
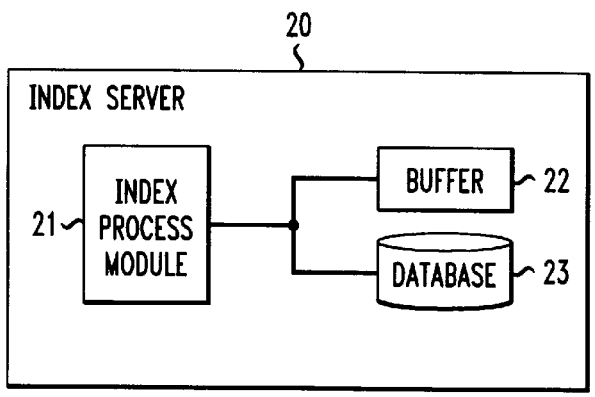
FIG. 2 is a block diagram of a server platform of the invention.

As shown in FIG. 2, the index server 20 may be a multimedia communications device such as a multicast server or a bridge. If a bridge is used, the bridge may repeatedly transmit the multimedia communications, one transmission for each source connected to the multimedia conference call. The multicast server may transmit the multimedia communications simultaneously to each of the sources. In the discussion that follows, the index server 20 participates in a multimedia conference call among the sources S1, S2 and S3. The index server 20 receives multimedia communications from all the sources and simultaneously retransmits the multimedia communications to all the sources. For example, the index server 20 receives multimedia including audio, video and data from sources S1, S2 and S3. The index server 20 then simultaneously retransmits, or multicasts, the multimedia communications from sources S2 and S3 to source S1, the multimedia communications from sources S1 and S2 to source S3, and the multimedia communications from sources S1 and S3 to source S2.

Also as shown in FIG. 2, the index server 20 includes a buffer 22 and a database 23. The buffer 22 temporarily stores data that is to be processed by an index process module 21. The buffer 22 is needed because of slight time delays between receipt of the multimedia communications and subsequent index processing. The buffer 22 is also necessary because feature recognition modules (to be described later) contained in the index process module 21 may require several milliseconds of data in order to correctly identify a distinguishing feature. However, the multimedia communications are received at the multicast server in multimedia data packets that may contain as few as 10 $\mu$sec of data. Thus, the buffer 22 may store the multimedia data packets temporarily until a sufficient amount of data is available to allow processing by the index process module 21.

The database 23 is used to store indexed multimedia communications for subsequent playback, and to store certain information related to the sources and to the participants in the multimedia communications. For example, all the communications received at the multicast network 10 include a time stamp. The time stamp, in addition to serving an indexing function, allows synchronization of the different multimedia communications. That is, the time stamp allows for synchronization of video and data communications from the source S1 and for synchronization of communications from the sources S1 and S2, for example. For indexing, the time stamp can be used to segment the multimedia conference call according to time, and an individual can replay selected portions of the multimedia conference call corresponding to a set time period. The time stamp information is stored in the database 23 along with the multimedia communications.

The index server 20 allows for indexing of the multimedia conference call. Specifically, the index server 20 may index the multimedia communications received from the sources S1, S2 and S3. The indexing adds metadata to the multimedia conference call data. The metadata could include information that identifies a particular participant, for example. In the preferred embodiment, speaker identification and face recognition software determines the identity of the participant. Once the participant is identified, the index server 20 creates an index table that becomes an index to the multimedia conference call. The indexing process will be described in more detail later. Furthermore, the invention is not limited to distinguishing between live persons. Any object may be distinguished according to the invention including animals, plants and inanimate objects.

Figure 3:
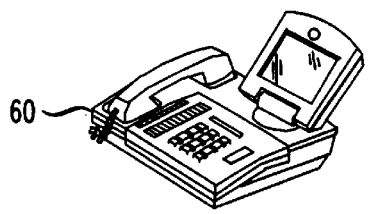
FIG. 3 is a block diagram of representative equipment used by multimedia conference call participants.
Figure 4:
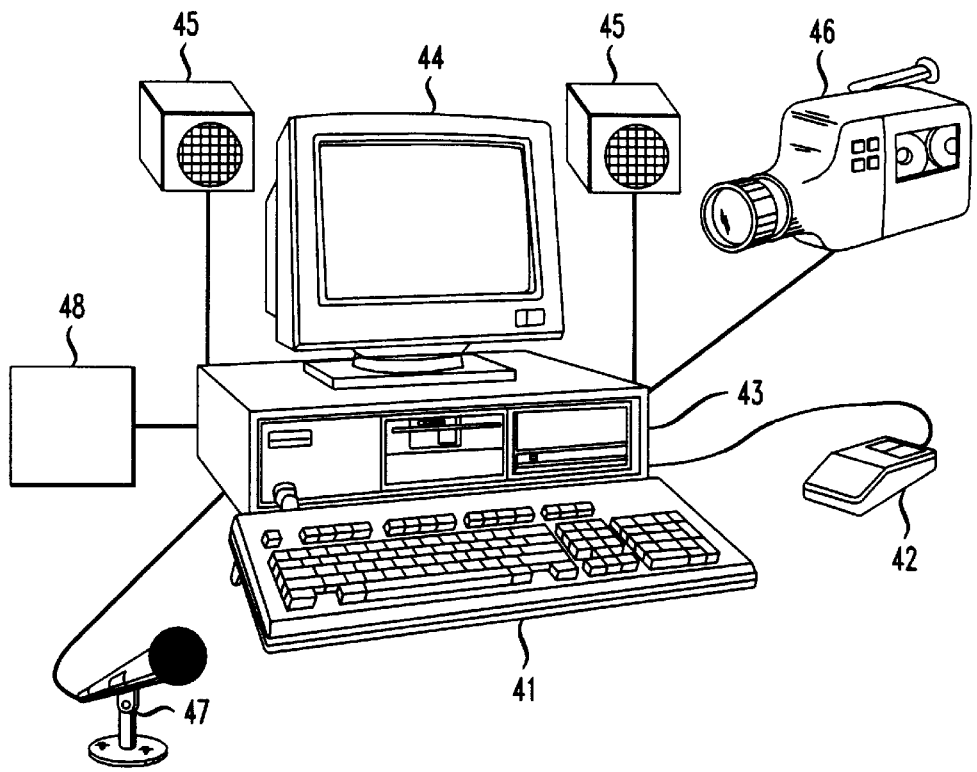
FIG. 4 is an alternate equipment arrangement.

FIGS. 3 and 4 show examples of a communications device available at the sources S1, S2 and S3. FIG. 3 shows a video phone 60 that is an example of a communication device that the participants may use to communicate multimedia information. FIG. 4 shows a computer 40 that is another example of a multimedia communications device that the participants may use in accordance with the invention. The computer 40 includes a data entry device such as a keyboard 41 and a mouse 42, a central processor unit (CPU) 43, a visual display 44, speakers 45, a video camera 46 and a microphone 47. The computer 40 connects to the multicast network 10 through LAN connectors 48. The computer 40 may be a personal computer, a portable computer, a workstation or a main frame computer. The microphone 47 captures and transmits the audio portion of the multimedia conference call. An analog to digital converter or sound card (not shown) converts the analog speech into a digital representation. The video camera 46 captures and transmits an image of each participant. The video camera 46 may be an analog or a digital camera. If an analog camera is used, the video signal from the video camera 46 is first sent to a codec (not shown) for conversion to a digital signal before it is transmitted to the multicast network 10. Furthermore, the video camera 46 may be voice activated so that the video camera 46 slews, or rotates, to capture the image of a speaker. The speakers 45 provide audio signals to the participants. The display 44 may display images of the participants. The display 44 may also display information related to the multimedia call such as a call label and toolbars that allow the participants to interact with the index server 20 in the multicast network 10.

The computer 40 is provided with a specific application program that allows the participants to interface with the index server 20 and other network components. The keyboard 41 and the mouse 42 function as data input devices that allow participants to send commands to the index server 21, for example. The computer 40 includes a packet assembler (not shown) that compresses and assembles the digital representations of the multimedia communications into discrete packets. The CPU 43 controls all functions of the computer 40.

As noted above, at least two ways are available to identify individual conference call participants. Face recognition software such as FACEIT® automatically detects, locates, extracts and identifies human faces from live video. FACEIT® requires a personal computer or similar device and a video camera and compares faces recorded by the video camera to data stored in a database such as the database 23, using statistical techniques. FACEIT® is described in detail at http://www.faceit.com.

FACEIT® uses an algorithm based on local feature analysis (LFA) which is a statistical pattern representation formalism that derives from an ensemble of examples of patterns a unique set of local building blocks that best represent new instances of these patterns. For example, starting with an ensemble of facial images, LFA derives the set of local features that are optimal for representing any new face. Equipped with these universal facial building blocks, FACEIT® automatically breaks down a face into its component features and compares these features to stored data such as data stored in the database 23. Therefore, to use FACEIT®, each multimedia conference call participant's face must first be registered with the multimedia service so that the facial features can be stored in the database 23. Then, during subsequent multimedia conference calls, FACEIT® can be used to identify a face from all the faces being captured by the video cameras 46. Although the above discussion refers to FACEIT®, it should be understood that the present invention is not limited to use of this particular facial identification system.

In addition to face recognition, the preferred embodiment includes a speech recognition feature in which a participant is identified based on spectral information from the participant's voice. As with the face recognition feature, the multimedia conference call participant must first register a speech sample so that a voice model is stored in the database 23. The speech recognition feature requires an input, a processor and an output. The input may be a high quality microphone or microphone array for speech input and an analog to digital conversion board that produces digital speech signals representative of the analog speech input. The processor and output may be incorporated into the multicast network 10. A speech recognition system is described in detail in U.S. Pat. No. 5,666,466, which is hereby incorporated by reference.

By using both speech recognition and face recognition systems, the preferred embodiment can reliably and quickly identify a particular multimedia conference call participant and thereby allow precise indexing of the multimedia conference call. That is, in a multimedia conference call involving several different sources with numerous participants at each source, identifying a particular participant out of the total group of participants is difficult to achieve with current systems. However, this invention can locate an individual to a particular source, such as source S1, based on source address and in addition, applies speech and face recognition, only among specific individuals at a particular location. The index process module 21 then compares participant face and speech patterns contained in the database 23 to audio information and video information being received at the multicast network 10 during the multimedia conference call. By using both face recognition and speech recognition systems, the invention is much more likely to correctly identify the particular participant than a system that uses only speech recognition, for example.

Other metadata may be used in addition to face and speech recognition data to index the multimedia conference call. For example, if the background changes, the index process module 21 can detect this event and record the change as metadata. Thus, if the video camera 46 that is recording the video portion of the multimedia conference call at a source, such as source S1, slews or rotates so that the background changes from a blank wall to a blackboard, for example, the index process module 21 may detect this change and record a background change event. This change in background can then be used for subsequent searches of the multimedia conference call. For example, the individual reviewing the contents of a multimedia conference call may desire to retrieve those portions of the multicast, multimedia conference call in which a blackboard at the source S1 is displayed. As with face and speech recognition, the index process module 21 may have stored in the database 23, a representation of the various backgrounds at the sources S1, S2 and S3, that are intended to be specifically identified. Similarly, a change in key scene features may be detected and used to classify or index the multimedia conference call. Key scene feature changes include loss or interruption of a video signal such as when a source, such as source S1, purposely goes off-line, for example.

Figure 5:
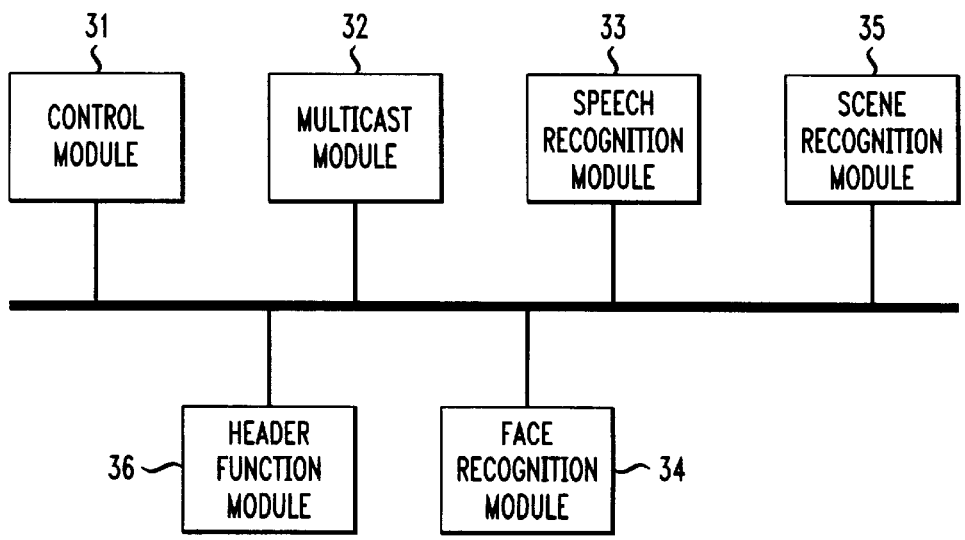
FIG. 5 is a logical diagram of an index server.

FIG. 5 shows the index process module 21 in detail. A control module 31 controls the functions of index process module 21. When multimedia communications are transmitted to the multicast network 10, a multicast module 32 in the index process module 21 receives and broadcasts the multimedia communications. In parallel with broadcasting the multimedia communications, a speech recognition module 33 compares data received by the multicast module 32 to speech models stored in the database 23 to determine if a match exists and outputs a speech identifier when the match exists. In addition, a face recognition module 34, which incorporates face recognition software such as FACEIT®, compares the data to face models stored in the database 23 and outputs a face identifier when a match is determined between video data comprising the multimedia communications and facial models stored in the database 23. Finally, a scene recognition module 35 compares scenes captured by the video camera 46 to scenes stored in the database 23 to determine if any background or key scene changes occurred. The scene recognition module 35 outputs a scene change identifier when a background change, for example, is detected. When any of the above recognition modules determines that a match exists, a header function module 36 receives the inputs from the face, speech and scene recognition modules 33, 34 and 35, respectively. The header function module 36, based on the inputs, creates an multimedia extension header, attaches the multimedia extension header to the multimedia data packet, and applies certain information, or data, to the multimedia extension header, based on the inputs received from the speech, face and scene modules 33, 34 and 35, respectively. The multimedia data packets with the modified headers are then retransmitted/multicast into the network. The multimedia extension header is described below.

As noted above, the present invention is able to provide indexing of multimedia communications because the multimedia data streams are divided into multimedia data packets, and each multimedia data packet contains at least one multimedia header. The conversion of the data into digital format is performed at the source, such as source S1. Specifically, a processor, such as the computer 40, receives the audio and video data in an analog format. For example, with the audio data, audio analog wave forms are fed into a sound card that converts the data into digital form. A packet assembler (not shown) then assembles the digitized audio data into multimedia data packets. The multimedia data packets include a segment that contains the digital data and a segment, or multimedia header, that contains other information, such as the source IP address and the destination IP address, for example. The multimedia header is also used by the index process module 21 to hold the data needed to provide the indexing function.

Figure 6:
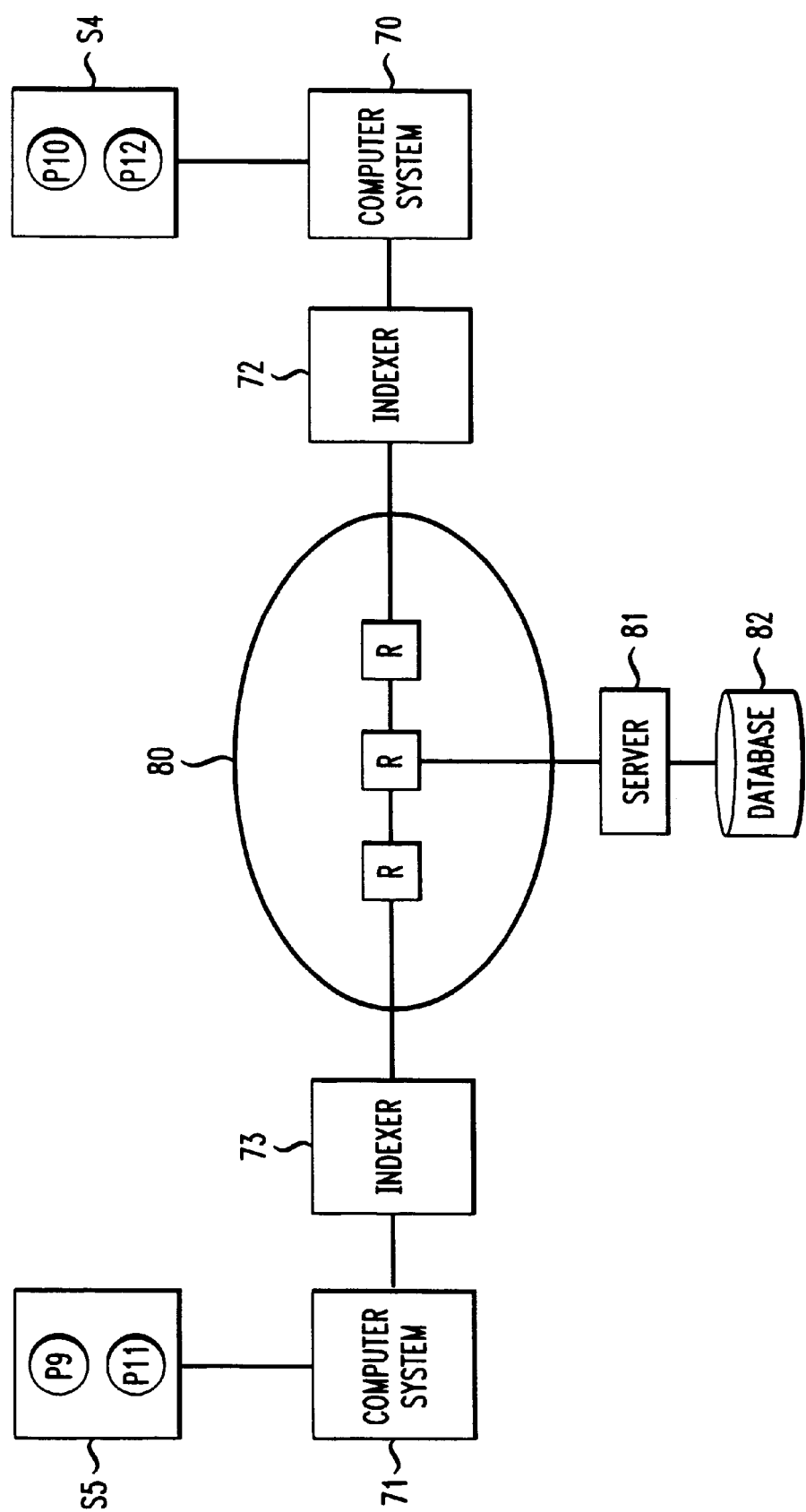
FIG. 6 is an alternate arrangement for a multicast network.

FIG. 6 shows an alternate arrangement of an apparatus for indexing multimedia communications. In FIG. 6, source S4 with participants P10 and P12 connects to a multicast network 80 via a computer system 70 and a local indexer 72. Source S5, with participants P9 and P11, connects to the multicast network 80 via a computer system 71 and a local indexer 73. The computer systems 70 and 72 (or 71 and 73) contain all the components and perform all the functions as the apparatus shown in FIG. 3.

Multimedia communications from the sources S4 and S5 are received at routers R located in the multicast network 80. The multicast network 80 connects to a server 81 that may be a multicast server or a bridge. Multimedia communications from the sources S4 and S5 may be stored in a database 82.

The apparatus of FIG. 6 differs from that of FIG. 1 in that the indexing function occurs locally at the sources S4 and S5. That is, face recognition and speech recognition functions, for example, are performed by the indexers 72 and 73 at the sources S4 and S5, respectively.

Figure 7:
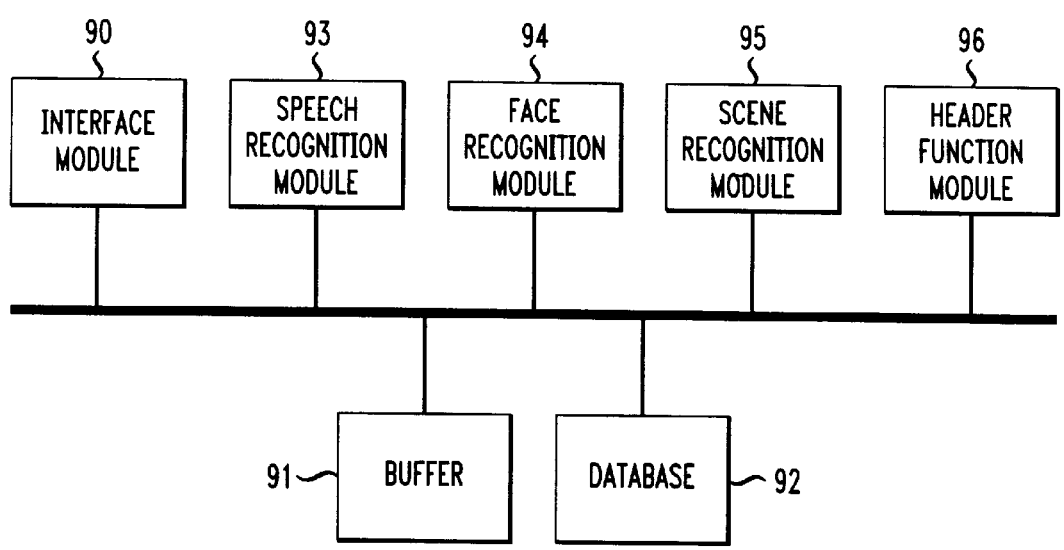
FIG. 7 is a logical diagram of an index used in the multicast network of FIG. 6.

FIG. 7 is a logical diagram of the indexer 72. The description that follows applies to the indexer 72. However, the indexer 73 is identical to the indexer 72; hence the following description is equally applicable to both indexers. An interface module 90 receives multimedia data packets from the computer system 70. A buffer 91 temporarily stores the multimedia data packets received at the interface module 90. A database 92 stores face, speech and background models for the source S4. A speech recognition module 93 compares audio received by the interface module 90 to speech models stored in the database 92 to determine if a speech pattern match exists. The speech recognition module 93 outputs a speech identifier when the speech pattern match exists. A face recognition module 94 compares video data received at the interface module 90 to face models stored in the database 92 to determine if a face pattern match exists, and outputs a face identifier when the face pattern match exists. A scene recognition module 95 compares scenes captured by the computer system 70 to scene models stored in the database 92, and outputs a scene identifier when a scene match exists. A header function module 96 creates a multimedia extension header, attaches the multimedia extension header to the multimedia data packet, and applies specific data to the multimedia extension header, based on the inputs from the speech, face and scene recognition modules 93, 94 and 95, respectively. The local indexer 72 may also incorporate other recognition modules to identify additional distinguishing features for indexing the multimedia communications.

Figure 8:
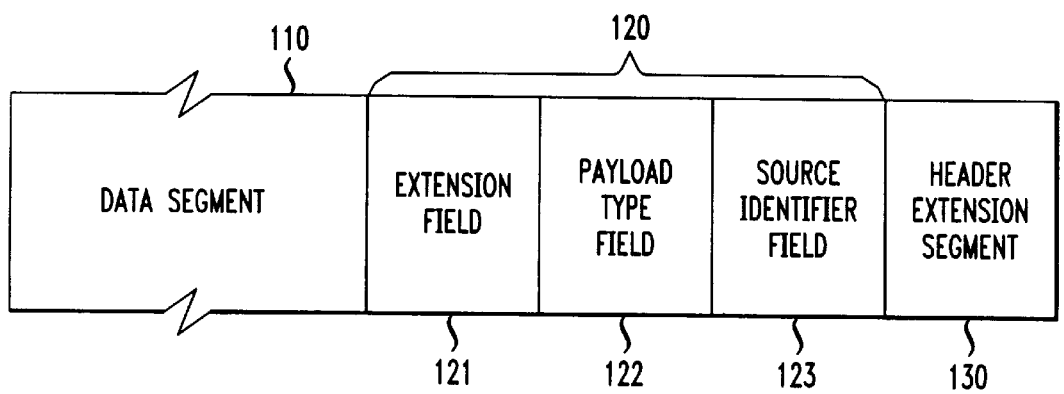
FIG. 8 is a representation of a multimedia data packet.

FIG. 8 shows a multimedia data packet 100. In FIG. 8, a data segment 110 (payload) contains the data, such as the audio data, for example, that was transmitted from the source S1. A multimedia data packet header segment 120 contains additional fields related to the multimedia communications. An extension field 121 may be used to indicate that the multimedia data packet 100 contains a multimedia extension header. A payload type field 122 indicates the type of data contained in the data segment 110. A source identifier field 123 indicates the source of the multimedia data packet. The header segment 120 may contain numerous additional fields.

Returning to the first embodiment, a header extension segment 130 may be added to allow additional information to be carried with the multimedia data packet header segment 120. When indexing a particular packet, the index process module 21 records the appropriate metadata in the header extension segment 130. In this case, a bit is placed in the extension field 121 to indicate the presence of the header extension segment 130. Once the multimedia data packet 100 arrives at the multicast network 10, the index process module 21 compares the data contained in the data segment 110 to face and speech models contained in the database 23. If a match is achieved, the control module 31 in the index process module 21 directs the header function module 36 to add to the multimedia data packet header segment 120, the header extension segment 130, which includes the speech or face identifiers, as appropriate. When the data in the data segment 110 indicates a background change or a key scene event, the index process module 21 adds a corresponding indication to the header extension segment 130.

In the preferred embodiment, the multimedia data packet 100 is then stored in the database 23. Alternately, the data in the data segment 110 may be separated from the multimedia data packet header segment 120. In that case, the index process module 21 creates a separate file that links the data in the multimedia data packet header segment 120 to the data contained in the data segment 110.

Figures 9, 10:
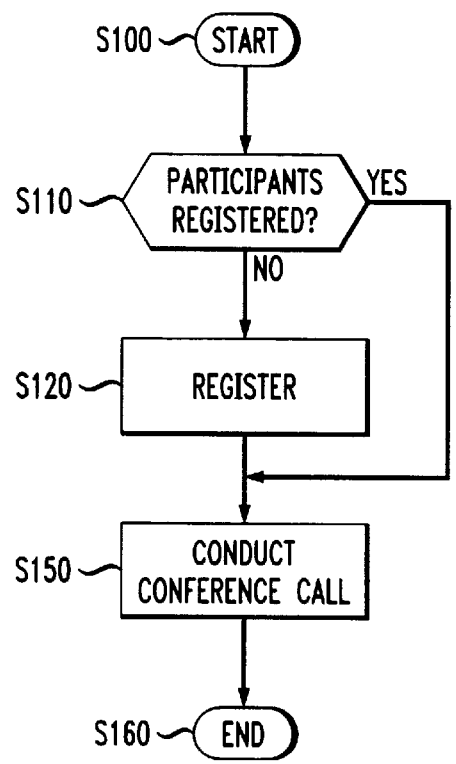
FIG. 9 is a logical representation of an index table.
FIG. 10 is a flowchart representing the multicast operation.

FIG. 9 is a logical representation of an index table for a multimedia conference call. In FIG. 9, the index process module 21 is receiving the multimedia conference call described above. When a participant such as participant P1 is speaking, the header function module 36 adds to the multimedia data packet, a header extension segment 130 that includes an index/ID for participant P1. The index process module 21 then stores the resulting multimedia data packet in the database 23. Thus, as shown in FIG. 9, for participant P1 at location S1, the database 23 stores a speaker ID model VO-102 and a video model VI-356. Then, by specifying the participant P1 (associated with VO-102 and VI-356), the corresponding data packets can be retrieved from the database 23 and their contents reviewed.

To identify a particular participant based on information in a multimedia data packet, such as the multimedia data packet 100, the index process module 21 first retrieves the multimedia data packet 100 from the buffer 22. The index process module 21 reads the payload type field 122 in the data packet header segment 120 to determine if the multimedia data packet 100 contains audio data. If the multimedia data packet 100 contains audio data, the index process module 21 determines if there is a multimedia data packet from the same source with a corresponding time stamp that contains video data. With both video and audio multimedia data packets from the same source with approximately the same time stamp, the index process module 21 can then compare the audio and video data to the speech and face models contained in the database 23. For example, the face recognition module 34, containing FACEIT®, compares the digitized video image contained in the multimedia data packets 100 to the face models stored in the database 23. The speech recognition module 32 compares the digitized audio in the multimedia data packets 100 to the speech models stored in the database 23. By using both speech and face recognition features, the index process module 21 may more reliably identify a particular participant.

FIG. 10 is a flowchart representing the process of indexing multimedia communications in accordance with the multicast network 10 shown in FIG. 1. The index process module 21 starts with step S100. In step S110, the index process module 21 queries all participants to register their face and speech features. If all participants are registered, the index process module 21 moves to step S150. Otherwise, the index process module 21 moves to step S120. In step S120, individual participants register their face and speech features with the index process module 21. The index process module 21 then moves to step S150.

In step S150, the index process module 21 stores the multimedia communications from the sources S1, S2 and S3 in the buffer 22. That is, the index process module 21 stores the multimedia data packets containing the audio, video and data communications from the sources S1, S2 and S3. The index process module 21 then moves to step S160 and the multimedia communications end.

Figure 11A:
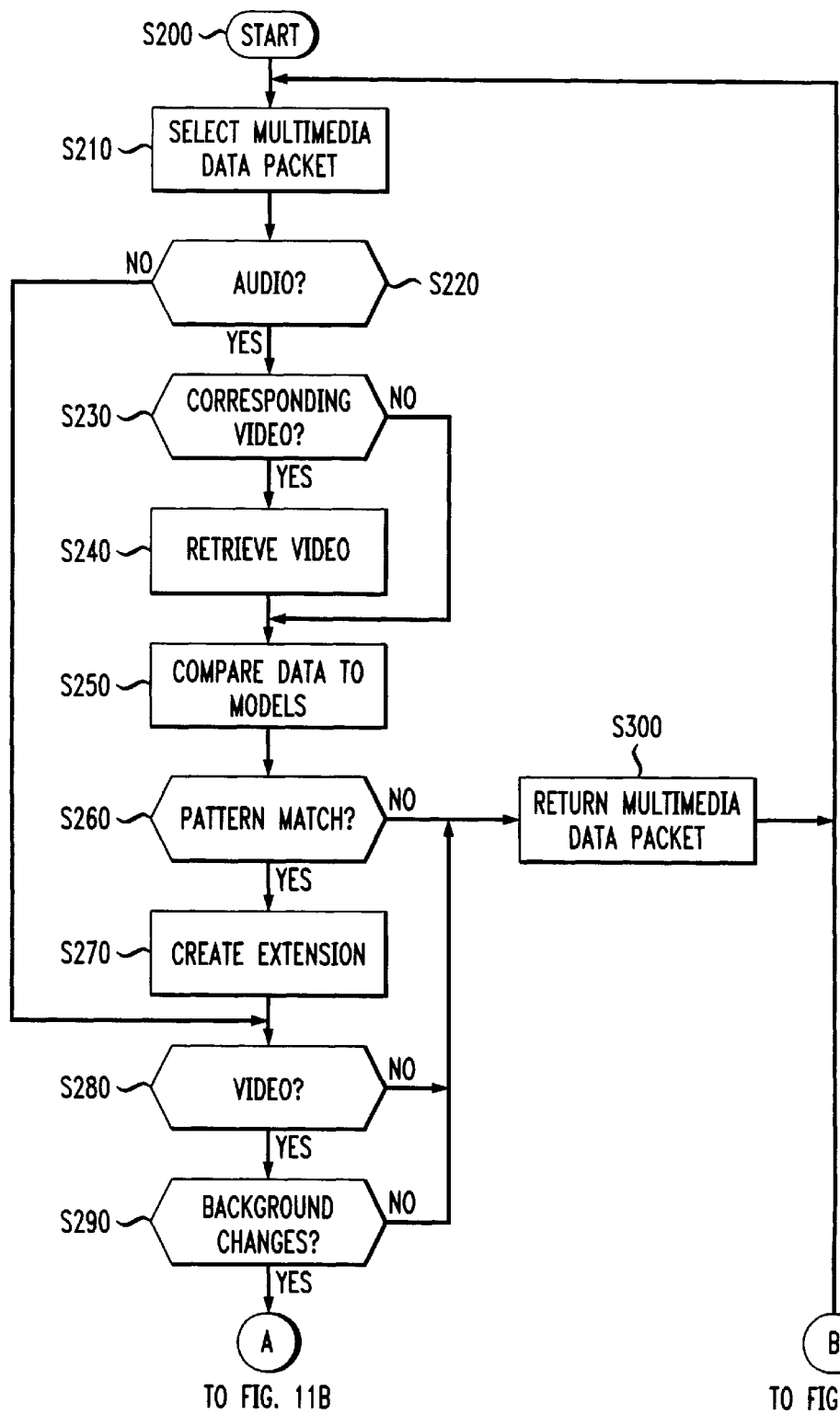
FIGS. 11A and 11B show a flowchart representing operation of the indexing process.
Figure 11B:
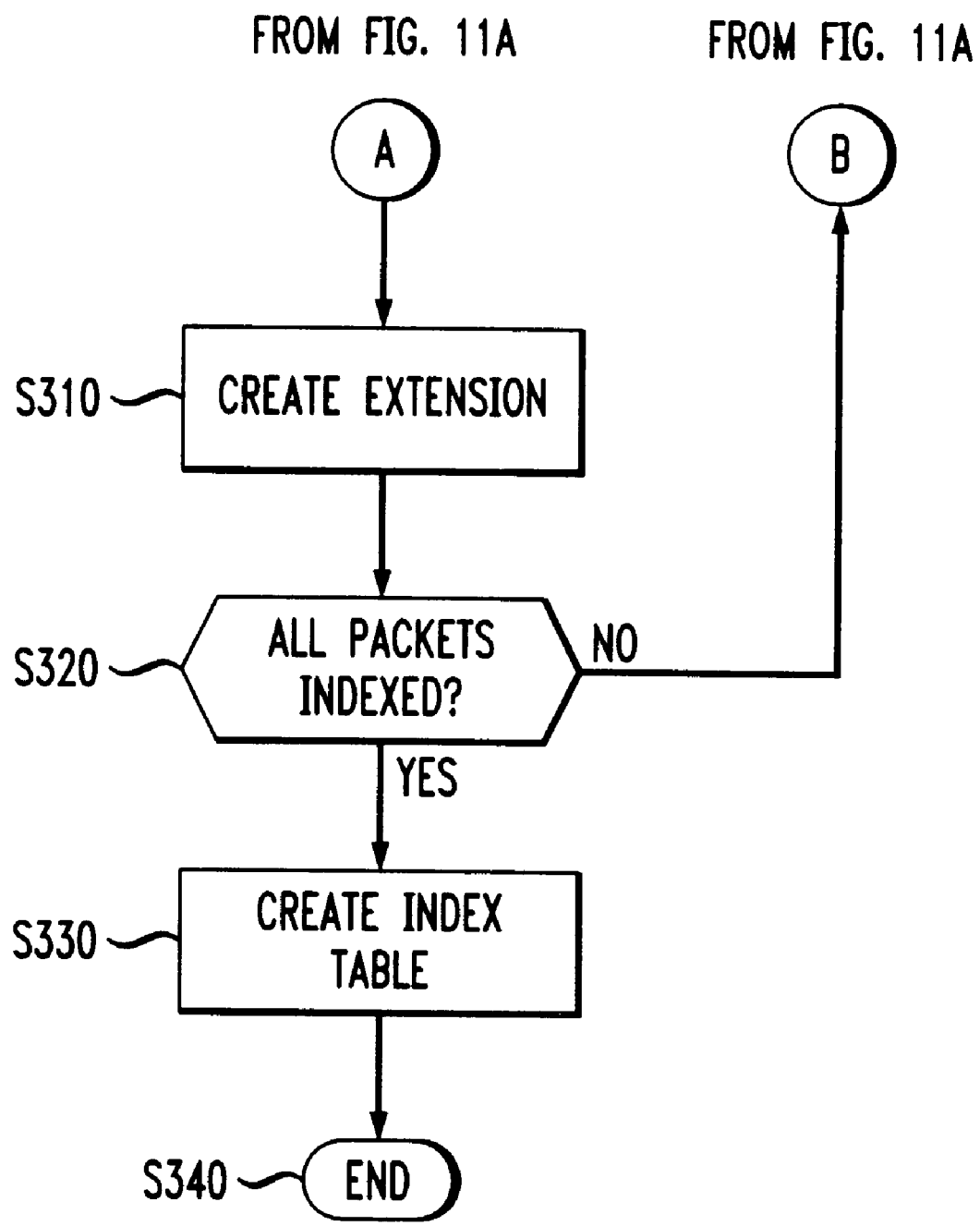

FIGS. 11A and 11B show processing of the multimedia data packets which were stored in the buffer 22 (of FIG. 2) during the multimedia communications of FIG. 10, using the multicast network of FIG. 1. In FIG. 11A, the index process module 21 processes each multimedia data packet to identify participants by face and speech patterns. The index process module 21 starts at step S200. In step S210, the index process module 21 selects a multimedia data packet for indexing. The index process module 21 then moves to step S220. In step S220, the index process module 21 reads the payload type field 122 and source identifier field 123. The index process module 21 thus determines the source of the multimedia data packet and the type of data. If the multimedia data packet contains audio data, the index process module 21 moves to step S230. Otherwise the index process module 21 jumps to step S280.

In step S230, the index process module 21 notes the time stamp of the multimedia data packet and determines if there are any corresponding video multimedia data packets from the same source with approximately this time stamp. If there are, the index process module 21 moves to step S240. Otherwise, the index process module 21 jumps to step S250. In step S240, the index process module 21 retrieves the corresponding video multimedia data packet identified in Step S230. The index process module 21 then moves to step S250.

In step S250, the index process module 21 compares the audio and video data contained in the multimedia data packets to face and speech models for the sources as identified by the source identifier field of FIG. 8 stored in the database 23. The index process module 21 then moves to step S260. In step S260, the index process module 21 determines if there is a pattern match between the audio and video data contained in the multimedia data packets and the face and speech models. If there is a match, the index process module 21 moves to step S270. Otherwise the index process module 21 moves to step S300.

In step S270, the index process module 21 creates a variable length header extension segment and attaches the segment to the multimedia data packet header. The index process module 21 places a bit in the extension field 122 to indicate the existence of the header extension segment. The index process module 21 also populates the header extension segment with data to indicate the identity of the participant. The index process module 21 then stores the multimedia data packet in the database 23 (as detailed in FIG. 11B). The index process module 21 then moves to step S280.

In step S280, the index process module 21 determines if the multimedia data packet selected in step S210 contains video data. If the multimedia data packet contains video data, the index process module 21 moves to step S290. Otherwise the index process module 21 process moves to step S300. In step S290, the index process module 21 determines if the multimedia data packet contains background change or key scene change data. If the multimedia data packet contains the data, the index process module 21 moves to step S310. Otherwise the index process module 21 moves to step S300.

In step S310, the index process module 21 creates a variable length header extension segment and attaches the segment to the multimedia data packet header. The index process module 21 places a bit in the extension field 122 to indicate the existence of the header extension segment. The index process module 21 also populates the header extension segment with data to indicate the identity of the change event. The index process module 21 then stores the multimedia data packet in the database 23. The index process module 21 then moves to step S320.

In step S300, the index process module 21 stores the multimedia data packet in the database 23 without the header extension segment and without the bit in the extension field. The index process module 21 then returns to step S210.

In step S320, the index process module 21 determines if all the multimedia data packets for the multimedia communication have been indexed. If all multimedia data packets have not been indexed, the index process module 21 returns to step S210. Otherwise the index process module 21 moves to step S330. In step S330, the index process module 21 creates an index table that associates the identity of each participant with corresponding multimedia data packets and indicates for each multimedia data packet, the appropriate face and speech model for the participant. For multimedia data packets that contain background and scene change data, the index table includes a reference to the change event. The index process module 21 then moves to step S340 and ends processing of the multimedia data packets.

In the illustrated embodiments, suitably programmed general purpose computers control data processing in the multicast network 10 and at the sources. However, the processing functions could also be implemented using a single purpose integrated circuit (e.g., an ASIC) having a main or central processor section for overall, system-level control, and separate circuits dedicated to performing various specific computational functional and other processes under control of the central processor section. The processing can also be implemented using separate dedicated or programmable integrated electronic circuits or devices (e.g., hardwired electronic or logical devices). In general, any device or assembly of devices on which a finite state machine capable of implementing the flowcharts of FIGS. 10, 11A and 11B can be used to control data processing.

The invention has been described with reference to the preferred embodiments thereof, which are illustrative and not limiting. Various changes may be made without departing from the spirit and scope of the invention as defined in the following claims.

What is claimed is:

1. A method for indexing a multimedia communication, comprising:

receiving the multimedia communication, the multimedia communication including a plurality of multimedia data packets;

processing the plurality of multimedia data packets to identify distinguishing features and associating each of the plurality of multimedia data packets with one of a plurality of objects within the multimedia communication;

comparing the distinguishing features with representations of the plurality of objects stored within a database to create verified distinguishing features;

associating the verified distinguishing features with each one of a plurality of objects;

indexing the plurality of multimedia data packets based on the verified distinguishing features; and rebroadcasting in near real-time, during the multimedia communication, the processed plurality of multimedia data packets, wherein when the object is a speaker participating in the multimedia communication, combination of the speaker's audio speech patterns and video statistical sampling of a face of the speaker is a portion of the distinguishing features.

2. The method of claim 1, wherein the distinguishing features are based on at least one of audio data and video data of the multimedia communication.

3. The method of claim 1, wherein the objects include at least one of a person, an animal, a plant, and an inanimate object.

4. The method of claim 3, wherein a multimedia data packet of the plurality of multimedia data packets includes a payload having one of the audio and the video data that corresponds to an object, the associating step attaching a header identifier that identifies the object.

5. The method of claim 4, wherein the speaker is associated with the multimedia data packet if the portion of the distinguishing features is included in the payload of the multimedia data packet.

6. The method of claim 4, further comprising:

identifying background changes in the video data;

identifying key scene events based on the video data; and attaching a second header identifier to each multimedia data packet containing the background change and the key scene event, the second header identifier identifying the multimedia data packet as containing a background change and a key scene event.

7. The method of claim 6, wherein the multimedia communication is a multicast multimedia communication, the rebroadcasting step including multicasting the processed plurality of multimedia data packets.

8. The method of claim 7, wherein a time stamp is provided to synchronize the audio and the video data.

9. The method of claim 8, further comprising storing the indexed plurality of multimedia data packets, wherein the indexed plurality of multimedia data packets can be searched to retrieve audio and video multimedia data packets corresponding to selected distinguishing features.

10. The method of claim 9, wherein the indexed plurality of multimedia data packets can be searched using key words.

11. The method of claim 10, wherein the multimedia communication is conducted using a local area network.

12. The method of claim 1, wherein the indexing and the processing steps are performed at a multicast network.

13. An apparatus for indexing a multimedia communication, comprising:

a server that receives multimedia communication in multimedia data packets including audio, visual and data communications and identifies distinguishing features in the multimedia communication based on at least one of audio and video recognition and a source of the multimedia communications;

a header function module connected to the server, the header function module entering metadata in a header segment corresponding to the multimedia data packets received by the server, the metadata being related to the distinguishing features;

an index server that rebroadcasts in near real-time the multimedia communication;

a storage device that stores the multimedia data packets, wherein the distinguishing features include audio, voice and video face patterns of participants in the multimedia communication.

14. The apparatus of claim 13, wherein the metadata includes voice and face identifiers of the participants.

15. The apparatus of claim 14, wherein the server identifies background changes in the video multimedia data packets and wherein the header function module enters second metadata in the header segment corresponding to the multimedia data packets having background changes, the second metadata including scene identifiers.

16. The apparatus of claim 15, wherein the server is an multicast server.

17. The apparatus of claim 16, wherein the server comprises audio, video and data bridges.

18. A method of identifying participants to a multimedia communication that is rebroadcast in near real-time, comprising:

comparing audio speech patterns for each participant to speech models;

comparing video face patterns for each participant to face models;

determining an identity of a particular participant when both the audio speech patterns and the video face patterns match the speech and the face models for the particular participant; and creating an index of the participants based on identification of speech and face patterns of the participants, the index being used to segment the multimedia communication.

* * * * *